Patented Apr. 22, 1952

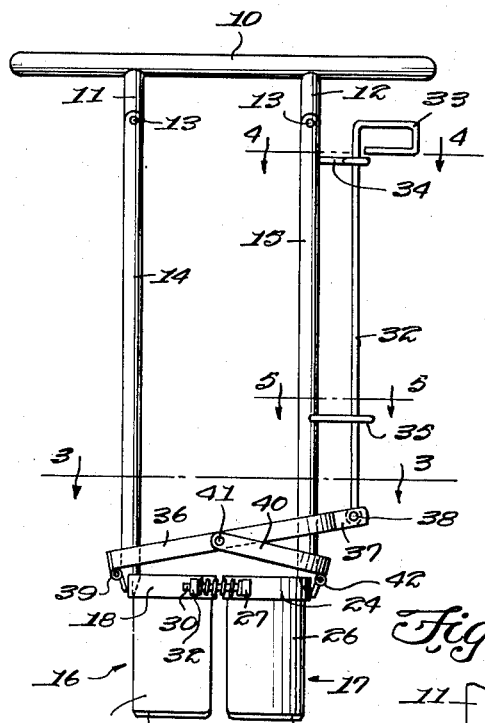

2,593,924

UNITED STATES PATENT OFFICE 2,593,924

SMALL TREE AND PLANT EXTRACTOR

Warren G. Rothkamm, Lafayette, La.

Application February 2, 1950, Serial No. 141,938

1 Claim. (Cl. 294—50.7)

This invention relates to a gardener's tool, and more particularly to a tool for extracting or digging and transplanting flowers, plants and small trees.

The object of the invention is to provide a tool which will enable the user to extract or dig a plant or small tree in such a manner that a sufficient quantity of earth will be retained around the roots of the plant or tree, whereby the plant or tree can be transplanted without injury thereto.

Another object of the invention is to provide a gardener's tool or implement that includes a plurality of coacting blades that are adapted to be forced into the earth surrounding the roots of a plant or small tree, there being a manually operable means for moving the blades toward each other so as to compress the earth around the roots whereby the plant can be moved to the desired location and released from the implement.

A further object of the invention is to provide a gardener's tool which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view of the gardener's implement constructed according to the present invention;

Figure 2 is a view similar to Figure 1, but showing the position of the parts when the blades are in their closed position;

Figure 3 is an enlarged sectional view taken on the line 3—3 of Figure 1;

Figure 4 is a sectional view taken on the line 4—4 of Figure 1;

Figure 5 is a sectional view taken on the line 5—5 of Figure 1;

Figure 6 is a fragmentary view showing the pivotal connection between the handle and one of the legs.

Referring in detail to the drawings, the numeral 10 designates a handle which may be made of any suitable material, such as metal, there being a pair of spaced parallel lugs 11 and 12 secured to the handle 10, as by welding. A pin 13 pivotally connects the bifurcated end of a leg 14 to the free end of the lug 11, Figure 6, and a similar pin 13 serves to pivotally connect another tubular leg 15 to the other lug 12.

Operatively connected to the lower ends of the legs 14 and 15 is a pair of coacting cutting or gripping members 16 and 17 which have identical structures. The cutting members 16 and 17 are mounted for movement toward and away from each other so as to selectively compress earth around the roots of a plant or small tree being transplanted, as later described in this application. The cutting member 16 includes an arcuate collar 18 that is secured to the free end of the leg 14 in any suitable manner. Secured to the collar 18, as by welding is a pair of curved blades 19 and 20, Figure 3. The lower end of each of the blades 19 and 20 is sharp or beveled, as at 21, so as to facilitate the movement of the blades into the ground around the roots of the plant. A pair of apertured ears 22 and 23 project from the collar 18 and are secured to the exterior surface thereof, as by welding, for a purpose to be later described.

The other cutting or gripping member 17 includes a curved or arcuate collar 24 that is secured to the free end of the other leg 15. A pair of curved blades 25 and 26 are secured to the inner surface of the collar 24, as by welding, and the free ends of the blades 25 and 26 are beveled or sharp, as at 21. A pair of spaced ears 27 and 28 project from the exterior surface of the collar 24 and are secured thereto for a purpose to be later described.

A means is provided for normally urging the members 16 and 17 away from each other. This means comprises a first pin 29 which has one end secured to the ear 28, while the other end of the pin 29 slidably projects through the apertured ear 23. A similar guide pin 30 has one end secured to the ear 27, while its other end slidably projects through the apertured ear 22. A coil spring 31 is circumposed on each of the pins 29 and 30, whereby the collars 18 and 24, and consequently the gripping members 16 and 17, will normally be urged apart.

A mechanism is also provided for manually moving the members 16 and 17 toward each other, so as to press a sufficient quantity of earth around the roots of the plant or tree being transplanted, whereby the plant can be lifted from the ground and moved to a desired location and released as desired. This last-named means comprises a pull rod 32 which is slidably connected to the leg 15. The pull rod 32 has one of its ends shaped to define a grip 33 that is adapted to be gripped in the user's hand and moved from the position of Figure 1 to the position shown in Figure 2 when the members 16 and 17 are to be moved toward each other. The pull rod 32 slidably projects through the eye of a first guide member that is secured to the upper end of the leg 15, and the pull rod 32 also slidably projects through a U-shaped guide member 35 that is secured to the lower portion of the leg 15.

The lower end of the rod 32 is pivotally connected to a pair of lugs 37, that are an integral part of a substantially circular strap 36, by a pin 38. A hinge 39 is secured to the strap 36, and the hinge 39 is also secured to the lower end of the leg 14. A U-shaped strap 40 has its free end pivotally connected to the strap 36 by a pair of pins 41, there being a hinge 42 connecting the strap 40 to the lower end of the leg 15. Straps 36 and 40 thus constitute a linkage mechanism, whereby upward manual movement of the pull rod 32 causes the members 16 and 17 to be moved toward each other to thereby compress the pair of coil springs 31.

In use, the parts are normally in the position shown in Figure 1. Then, to transplant or extract a plant or small tree from the earth, the members 16 and 17 are arranged in engagement with the ground surrounding the upper portion of the plant or flower, and a downwardly directed pressure is exerted on the handle 10. This causes the members 16 and 17 to be forced into the earth, the sharp edges 21 facilitating this movement of the members 16 and 17 into the ground surrounding the roots of the plant or tree. After the blades of the members 16 and 17 have been forced into the earth a sufficient distance, the rod 32 is pulled upwardly by means of the grip 33, so that it moves from the position of Figure 1 to the position shown in Figure 2. This movement of the rod 32 through the straps 36 and 40 results in the members 16 and 17 moving toward each other so that the earth therebetween will be compressed against the roots of the plant and then the entire plant and the earth between the members 16 and 17 can be lifted and carried to the desired location without injury to the plant or small tree. After the plants or trees have been carried to the desired location, the pull rod 32 can be released, whereupon the springs 31 will urge the members 16 and 17 apart, whereby the earth and plant being carried thereby will be released so that the tool and implement can be used over and over again.

From the foregoing, it is apparent that a tool or implement has been provided which will facilitate the extraction and transplanting of small trees, flowers or plants. The curved blades can be made of tempered steel, if desired, and the handle and legs can be made of light weight steel tubing. By using the device, the user will be sure that the plant and earth being transplanted will not slip accidentally from the blades. Also, when the blades are being forced into the ground, a slight twisting, circular motion of the handle 10 may facilitate the downward movement of the tool into the earth. By using the device, the transplanting can be accomplished in a very short period of time. If desired, the root stock and soil deposit that have been extracted may be placed in a burlap bag by releasing the pressure on the pull rod 32. The digging and extracting device of the present invention will leave no signs of the transplanting operations, and there will be no loose soil left on the surface of the ground.

I claim:

A gardener's tool comprising a handle, a pair of spaced parallel lugs projecting from said handle, a leg having one end pivotally connected to each of said lugs, a cutting member operatively connected to the other end of each of said legs and mounted for movement toward and away from each other, each of said cutting members comprising an arcuate collar secured to said leg, a pair of arcuate blades secured to each of said collars, each of said blades being provided with a sharp edge thereon, a pull rod slidably connected to one of said legs and provided with a grip thereon, link means connecting the other end of said pull rod to said cutting members for moving said cutting members toward each other, a pair of spaced ears projecting from each of said collars, a guide pin extending between said ears, and a coil spring circumposed on each of said guide pins and interposed between said ears for urging said cutting members away from each other.

WARREN G. ROTHKAMM.

REFERENCES CITED

The following references are of record in the file of this patent:

UNITED STATES PATENTS

| Number | Name | Date |
|---|---|---|
| 1,038,924 | Matthews | Sept. 17, 1912 |
| 1,706,332 | Theriot | Mar. 19, 1929 |
| 2,035,967 | Humphrey | Mar. 31, 1936 |